US010963229B2

(12) United States Patent
Wang et al.

(10) Patent No.: US 10,963,229 B2
(45) Date of Patent: Mar. 30, 2021

(54) JOINT COMPILATION METHOD AND SYSTEM FOR HETEROGENEOUS HARDWARE ARCHITECTURE

(71) Applicant: SHANGHAI DENGLIN TECHNOLOGIES CO., LTD, Shanghai (CN)

(72) Inventors: Chenhui Wang, Shanghai (CN); Fan Peng, Shanghai (CN); Xiaoquan Li, Shanghai (CN); Can Li, Shanghai (CN); Ping Wang, Shanghai (CN)

(73) Assignee: SHANGHAI DENGLIN TECHNOLOGIES CO., LTD, Shanghai (CN)

(*) Notice: Subject to any disclaimer, the term of this patent is extended or adjusted under 35 U.S.C. 154(b) by 0 days.

(21) Appl. No.: 16/523,119

(22) Filed: Jul. 26, 2019

(65) Prior Publication Data

US 2020/0104106 A1 Apr. 2, 2020

(30) Foreign Application Priority Data

Sep. 30, 2018 (CN) .......................... 201811153641.5

(51) Int. Cl.
*G06F 8/41* (2018.01)
*G06F 9/50* (2006.01)

(52) U.S. Cl.
CPC ............... *G06F 8/45* (2013.01); *G06F 8/443* (2013.01); *G06F 8/47* (2013.01); *G06F 9/5066* (2013.01)

(58) Field of Classification Search
CPC ..... G06F 8/41; G06F 8/45; G06F 8/47; G06F 8/443; G06F 8/451; G06F 9/5066
See application file for complete search history.

(56) References Cited

U.S. PATENT DOCUMENTS 8,051,412 B2 * 11/2011 Kasahara ................ G06F 8/456
717/149
8,296,743 B2 * 10/2012 Linderman ............. G06F 9/505
717/140
(Continued)

FOREIGN PATENT DOCUMENTS

CN 104598425 A * 5/2015
EP 1881405 B1 * 7/2018 ............. G06F 8/456
(Continued)

OTHER PUBLICATIONS

Hagerup, "Allocating Independent Tasks to Parallel Processors: An Experimental Study", 1997, Academic Press (Year: 1997).*
(Continued)

*Primary Examiner* — Anna C Deng
*Assistant Examiner* — Junchun Wu
(74) *Attorney, Agent, or Firm* — Zhong Law, LLC

(57) ABSTRACT

The present invention provides a joint compilation method and system for a heterogeneous hardware architecture. The method comprises steps of: determining, according to calculation characteristics of heterogeneous units in the hardware architecture, a strategy for dividing an overall calculation task graph into a plurality of subtasks, and allocating the plurality of divided subtasks to corresponding heterogeneous unit compilers for compilation to generate corresponding target machine instruction codes; and, linking the generated target machine instruction codes to form a set of machine instruction codes oriented to the heterogeneous hardware architecture. With the joint compilation method and system of the present invention, an executable program body, which can run on a heterogeneous hardware architecture system and be mixed with hardware machine instruction codes of various heterogeneous units at different levels, can
(Continued)

be automatically compiled, optimized and generated by activating one compilation.

10 Claims, 3 Drawing Sheets

(56) References Cited

U.S. PATENT DOCUMENTS

| | | | | | |
|---|---|---|---|---|---|
| 8,683,468 | B2* | 3/2014 | Breternitz | ............ | G06F 9/5066 |
| | | | | | 718/100 |
| 8,782,628 | B2* | 7/2014 | Andrade | ................... | G06F 8/44 |
| | | | | | 717/156 |
| 9,207,964 | B1* | 12/2015 | Gwosdek | .......... | G06F 17/30784 |
| 9,465,663 | B2* | 10/2016 | Mincarelli | ............ | G06F 9/5038 |
| 10,402,176 | B2* | 9/2019 | Glossop | .................. | G06F 8/447 |
| 2007/0283337 | A1* | 12/2007 | Kasahara | ................ | G06F 8/456 |
| | | | | | 717/149 |
| 2010/0153934 | A1* | 6/2010 | Lachner | .............. | G06F 9/30181 |
| | | | | | 717/146 |
| 2012/0159507 | A1* | 6/2012 | Kwon | ................... | G06F 9/5088 |
| | | | | | 718/104 |
| 2016/0371081 | A1* | 12/2016 | Powers | ................... | G06F 9/455 |
| 2017/0123775 | A1* | 5/2017 | Xu | ........................... | G06F 8/451 |
| 2017/0277654 | A1* | 9/2017 | Wang | ....................... | G06F 9/48 |
| 2020/0364091 | A1* | 11/2020 | Xia | ....................... | G06F 9/5027 |

FOREIGN PATENT DOCUMENTS

| | | | | | |
|---|---|---|---|---|---|
| EP | 2466460 B1 | * | 7/2018 | ........... | G06F 9/5088 |
| JP | 5984158 B2 | * | 9/2016 | ............. | G06F 8/456 |
| KR | 20170046778 A | * | 5/2017 | ............... | G06F 8/43 |

OTHER PUBLICATIONS

Ravi et al., "Compiler and Runtime Support for Enabling Generalized Reduction Computations on Heterogeneous Parallel Configurations", Jun. 2010, ACM (Year: 2010).*

Hormati et al., "Flextream: Adaptive Compilation of Streaming Applications for Heterogeneous Architectures", Sep. 2009, ResearchGate (Year: 2009).*

Phothilimthana et al., "Portable Performance on Heterogeneous Architectures", Mar. 2013, ACM (Year: 2013).*

* cited by examiner

JOINT COMPILATION METHOD AND SYSTEM FOR HETEROGENEOUS HARDWARE ARCHITECTURE

CROSS-REFERENCE TO RELATED APPLICATION

This application claims priority to Chinese Patent Application No. 2018111536415 filed Sep. 30, 2018, the content of which is incorporated herein by reference in its entirety.

TECHNICAL FIELD

The present invention relates to the technical field of compilers, and in particular to a joint compilation method and system for a heterogeneous hardware architecture.

BACKGROUND OF THE PRESENT INVENTION

An existing heterogeneous computing hardware architecture includes a series of heterogeneous devices that may differ greatly in hardware architecture, including such as, for example, a central processing unit (CPU), a graphics processing unit (GPU), a digital signal processor (DSP), a field-programmable gate array (FPGA), an application-specific integrated circuit (ASIC) and the like. During the compilation process, each type of heterogeneous devices itself corresponds to its respective compiler and tool chain. A calculation task needs to be divided into subtasks to be executed on various heterogeneous devices among the whole heterogeneous architecture. However, due to very high cost associated with coordination among these heterogeneous devices (e.g., data movement and synchronization between heterogeneous devices), the division of this calculation task is generally coarse-grained (that is, the workload of subtasks executed by different heterogeneous devices is relatively large), and the specific division scheme is usually regarded as a decision made by an application developer (that is, the subtask division and the device mapping are visible and controllable for the application developer).

Correspondingly, the compiler for each type of heterogeneous device only needs to compile the subtasks allocated to it. During this compilation process, underlying instructions are generated only for the hardware structure of this type of heterogeneous device. Although some general compiler frameworks are allowed to have a plurality of back ends for different hardware structures (this characteristic is called "retargetable", for example, an LLVM compiler framework includes various back ends for CPU/GPU/DSP and each back end generates corresponding different machine codes), only one back end will be used during one compilation of an application. This is because, technically, different compiler back ends are optimized by generating codes only for a particular hardware architecture without considering other hardware architecture conditions. Thus, the back ends will not interact or cooperate with each other. Additionally, compilers for some special heterogeneous devices can only process some limited combinations of calculation tasks. If an overall calculation task containing any unsupported calculation combinations is directly transmitted to such compilers, some constituent parts (e.g., front ends, middle ends or back ends) of the compilers cannot work correctly. This can cause a report of an error at a certain stage of the compilation and a termination of the compilation process.

In some implementations, a novel heterogeneous calculation hardware architecture provides heterogeneous operational units at different levels outside and inside a device. Heterogeneous operational units at a lower level inside the device require the compilation system to realize finer-grained division of the calculation task, and the division of the calculation task at this lower level depends on the compiler and the tool link. Meanwhile, these different heterogeneous operational units also need to use different compilers. This is because different heterogeneous calculation units are so different in hardware architecture that the code generations and underlying optimizations at the back ends basically have nothing in common, or even the middle ends and the front ends may be almost completely different in design and implementation. For such a novel heterogeneous device, during the compilation of an overall calculation task, the existing compilation technology cannot effectively combine the compilers of various heterogeneous units to participate in the finer-grained calculation task division and automatically coordinate the compilers associated with various heterogeneous operational units to realize various fine-grained interactions to complete one overall compilation task. Thus, the compilation requirements from this novel heterogeneous calculation system cannot be satisfied.

Therefore, it is necessary to improve the prior art to provide a compilation method that can combine heterogeneous unit compilers at various different levels.

SUMMARY OF THE PRESENT INVENTION

An objective of the present invention is to overcome the deficiencies in the prior art and provide a joint compilation method and system for a heterogeneous hardware architecture.

According to a first aspect of the present invention, a joint compilation method for a heterogeneous hardware architecture is provided. The method includes the following steps of:

step 1: determining, according to calculation characteristics of heterogeneous units in the hardware architecture, a strategy for dividing an overall calculation task into a plurality of subtasks, and allocating the plurality of divided subtasks to corresponding heterogeneous unit compilers for compilation to generate corresponding target machine instruction codes; and step 2: linking the generated target machine instruction codes to form a set of machine instruction codes oriented to the heterogeneous hardware architecture.

In an embodiment, in the step 1, the plurality of divided subtasks are allocated to corresponding heterogeneous unit compilers by the following sub-steps:

step 11: transmitting an overall calculation task graph to one of the heterogeneous unit compilers for compilation, wherein the overall calculation task graph contains subtask nodes to be compiled by the heterogeneous unit compilers; and step 12: identifying, by the one of the heterogeneous unit compiler, its own subtask node from the overall calculation task graph, compiling the subtask node, and transmitting the overall task graph to another heterogeneous unit compiler.

In an embodiment, in the step 1, the plurality of divided subtasks are allocated to corresponding heterogeneous unit compilers by the following sub-steps:

step 13: dividing the overall calculation task graph into a plurality of subtask graphs in advance, wherein one subtask graph corresponds to one heterogeneous unit compiler and contains all subtask nodes to be processed by this heterogeneous unit compiler; and step 14: allocating the plurality of subtask graphs to corresponding heterogeneous unit compilers, respectively.

In an embodiment, in the step 1, the strategy for dividing the overall calculation task graph into a plurality of subtasks is determined according to the following principle:

marking out, from the overall calculation task graph, subtasks to be processed by a special heterogeneous unit compiler in a performance-oriented manner; and allocating unallocated subtasks in the overall calculation task graph to a general heterogeneous unit compiler for processing.

In an embodiment, the step 1 further includes: dynamically optimizing, based on a compilation performance result fed back by the heterogeneous unit compilers, the strategy for dividing the overall calculation task graph into a plurality of subtasks.

In an embodiment, the compilation performance result includes execution time of a heterogeneous unit, a bandwidth of storage access, or a duty or idle ratio.

In an embodiment, the heterogeneous unit compilers include a heterogeneous device-level compiler for a device, or a heterogeneous operational-unit-level compiler for an operational unit in the device, or a combination of the heterogeneous device-level compiler and the heterogeneous operational-unit-level compiler.

According to a second aspect of the present invention, a joint compilation system for a heterogeneous hardware architecture is provided. The system includes a high-level compiler general control unit, a plurality of heterogeneous unit compilers and a machine instruction code linker, wherein:

the high-level compiler general control unit is configured to determine, according to calculation characteristics of heterogeneous units in the hardware architecture, a strategy for dividing an overall calculation task graph into a plurality of subtasks and allocate the plurality of divided subtasks to the plurality of corresponding heterogeneous unit compilers;

the plurality of heterogeneous unit compilers are configured to compile the allocated subtasks to generate corresponding target machine instruction codes; and the machine instruction code linker is configured to link the target machine instruction codes to form a set of machine instruction codes oriented to the heterogeneous hardware architecture.

In an embodiment, the high-level compiler general control unit is in communication connection with one of the plurality of heterogeneous unit compilers, and the high-level compiler general control unit is configured to transmit the overall calculation task graph to said one of the plurality of heterogeneous unit compilers for compilation, wherein the overall calculation task graph contains subtask nodes to be compiled by the plurality of heterogeneous unit compilers; and said one of the plurality of heterogeneous unit compilers is in communication connection with another heterogeneous unit compiler, and said one of the plurality of heterogeneous unit compilers is configured to identify its own subtask node from the overall calculation task graph, then compile the subtask node and transmit the overall task graph to said another heterogeneous unit compiler.

In an embodiment, the high-level compiler general control unit is in communication connection with the plurality of heterogeneous unit compilers, respectively, and the high-level compiler general control unit is configured to divide the overall calculation task graph into a plurality of subtask graphs in advance and allocate the plurality of subtask graphs to the plurality of corresponding heterogeneous unit compilers, respectively, wherein one subtask graph corresponds to one heterogeneous unit compiler and contains all subtask nodes to be processed by this heterogeneous unit compiler.

In an embodiment, the plurality of heterogeneous unit compilers include a heterogeneous device-level compiler for a device, or a heterogeneous operational-unit-level compiler for an operational unit in the device, or a combination of the heterogeneous device-level compiler and the heterogeneous operational-unit-level compiler.

In an embodiment, the device is at least one of CPU, GPU, DSP, FPGA and ASIC or a device combined by at least two of them.

Compared with the prior art, the present invention has the following advantages. With the joint compilation technology using various heterogeneous hardware compilers, a user only needs to activate one compilation process for each overall calculation task, and an executable program body that can run on the heterogeneous hardware architecture and can be mixed with hardware machine instruction codes of various heterogeneous units at different levels is automatically compiled, optimized and generated by a software stack of the whole set of joint compilers, so that the whole system can effectively run the overall application. Moreover, the user only needs to provide a logical overall calculation task without having to considering that each part of the calculation task is finally completed by which heterogeneous execution unit.

BRIEF DESCRIPTION OF THE DRAWINGS

The following accompanying drawings are merely for schematically describing and explaining the present invention, rather than limiting the scope of the present invention, in which.

DETAILED DESCRIPTION OF THE PRESENT INVENTION

To make the objectives, technical solutions, design methods and advantages of the present invention clearer, the present invention will be further described below in detail by specific embodiments with reference to the accompanying drawings. It should be understood that the specific embodiments described herein are merely for explaining the present invention, rather than limiting the present invention.

In all examples shown and discussed herein, any specific value should be interpreted as being exemplary but not limiting. Therefore, other examples of exemplary embodiments may have different values.

Technologies, methods and devices known to a person of ordinary skill in the related art may not be discussed in detail, but where appropriate, the technologies, methods and devices should be regarded as a part of this specification.

Figure 1:
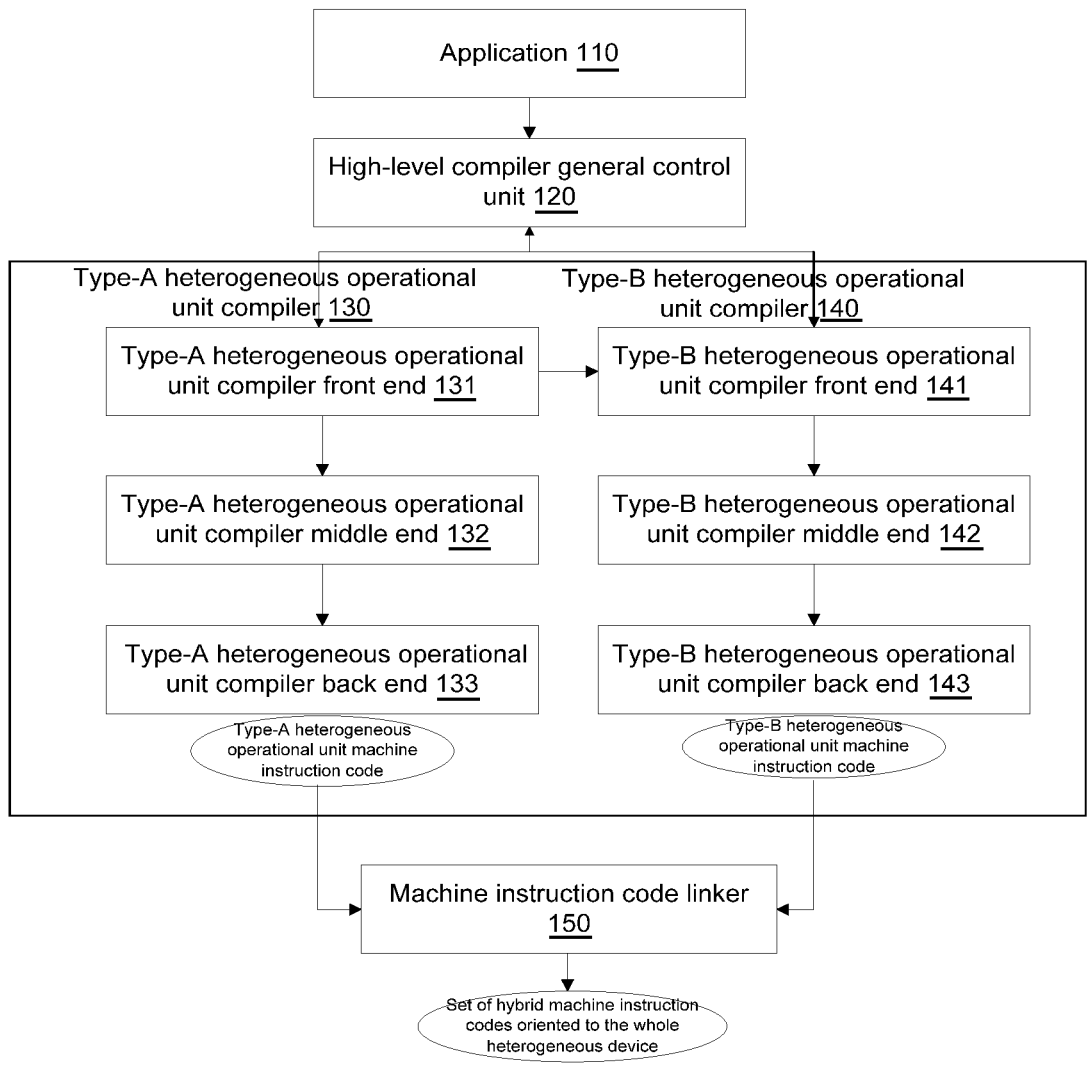
FIG. 1 shows a schematic diagram of a joint compilation system for a heterogeneous hardware architecture according to an embodiment of the present invention.

FIG. 1 shows a joint compilation system for a heterogeneous hardware architecture according to an embodiment of the present invention. The system includes an application 110, a high-level compiler general control unit 120, and a plurality of heterogeneous operational unit compilers of different types. Type-A heterogeneous operational unit compilers 130 and type-B heterogeneous operational unit compilers 140 are shown. Each compiler includes a front end, a middle end and a back end, including a type-A heterogeneous operational unit compiler front end 131, a type-A heterogeneous operational unit compiler middle end 132 and a type-A heterogeneous operational unit compiler back end 133, or including a type-B heterogeneous operational unit compiler front end 141, a type-B heterogeneous operational unit compiler middle end 142 and a type-B heterogeneous operational unit compiler back end 143. The system further includes a machine instruction code linker 150.

The application 110 is programmed to perform an overall calculation task according to calculation requirements. In the present invention, the application 110 only needs to provide an overall logical calculation task without having to specifying that a certain part of the calculation task is finally implemented by which type of heterogeneous operational unit.

The high-level compiler general control unit 120 is configured to divide, according to calculation characteristics of different types of heterogeneous operational unit compilers, the overall calculation task received from the application 110 into one or more subtasks, allocate the subtasks to corresponding types of heterogeneous operational unit compilers and activate the compilation process of the subtasks, for example, allocating subtasks to the type-A heterogeneous operational unit compilers and the type-B heterogeneous operational unit compilers, respectively.

The type-A heterogeneous operational unit compilers 130 are configured to identify the subtasks allocated thereto and activate compilation to generate corresponding machine instruction codes of the type-A heterogeneous operational units. For example, the type-A heterogeneous operational unit compilers 130 can interact with the high-level compiler general control unit 120 through the front end 131 to receive the subtasks allocated thereto. The front end 131 is further configured to perform lexical analysis, syntax analysis, semantic analysis and the like on source codes of the input calculation task. The middle end 132 is configured to generate intermediate codes (IRs). The back end 133 is responsible for analyzing and optimizing the intermediate codes and generating machine instruction codes. The type-B heterogeneous operational unit compilers 140 are similar to the type-A heterogeneous operational unit compilers 130 in structure and function and thus a detailed description thereof will be omitted. The type-B heterogeneous operational unit compilers 140 finally compile the subtasks allocated thereto to generate machine instruction codes of the type-B heterogeneous operational units.

The machine instruction code linker 150 is configured to link the machine instruction codes generated by the type-A heterogeneous operational unit compilers 130 and the type-B heterogeneous operational unit compilers to form machine instruction codes oriented to the whole heterogeneous hardware architecture.

In conclusion, in the present invention, the high-level compiler general control unit 120 is provided to generally coordinate and control heterogeneous operational unit compilers at a lower level; while for various types of low-level heterogeneous operational units, various machine instruction codes are still generated by the basically independent special compilers. The different types of heterogeneous operational unit compilers have the following characteristics: 1) compiler front ends that are not completely the same: the difference in hardware function leads to various compiler front ends that are not completely the same, but the compilers of different heterogeneous operational units will support a certain common high-level function subset; 2) different compiler middle ends: the design and implementation of intermediate IRs of the compiler middle ends, as well as various high-level optimization strategies, are also different due to the significant differences in hardware structures among the heterogeneous operational units; and 3) completely different compiler back ends: due to the significant differences in hardware structures among different heterogeneous operational units, the code generation and the underlying optimization at the back ends basically has nothing in common. Therefore, the middle ends and back ends of the heterogeneous operational unit compilers are different and can be implemented completely independently. The front ends can also be completely independent in implementation, or alternatively, can share analysis codes for a common function subset.

It is to be noted that, in the embodiment of FIG. 1, only two types of heterogeneous operational unit compilers are shown schematically; however on this basis, the system shown in FIG. 1 can be extended by those skilled in the art to include more types of heterogeneous operational unit compilers. For example, the system may further include type-C heterogeneous operational unit compilers, type-D heterogeneous operational unit compilers and the like. Similarly, the type-C heterogeneous operational unit compilers (front ends) can be in communication connection with the type-B heterogeneous operational unit compilers (front ends) and interact with the high-level compiler general control unit 120, and the like. Here, the letters such as A, B, C and D are merely used for representing different types of heterogeneous operational units and corresponding compilers, regardless of the specific models of the heterogeneous operational units and their compilers. Additionally, each heterogeneous operational unit compiler does not necessarily include a front end, a middle end, or a back end, as long as the heterogeneous operational unit compiler can realize the interaction with the high-level compiler general control unit 120 of the present invention and the conventional compiler functions.

Figure 2:
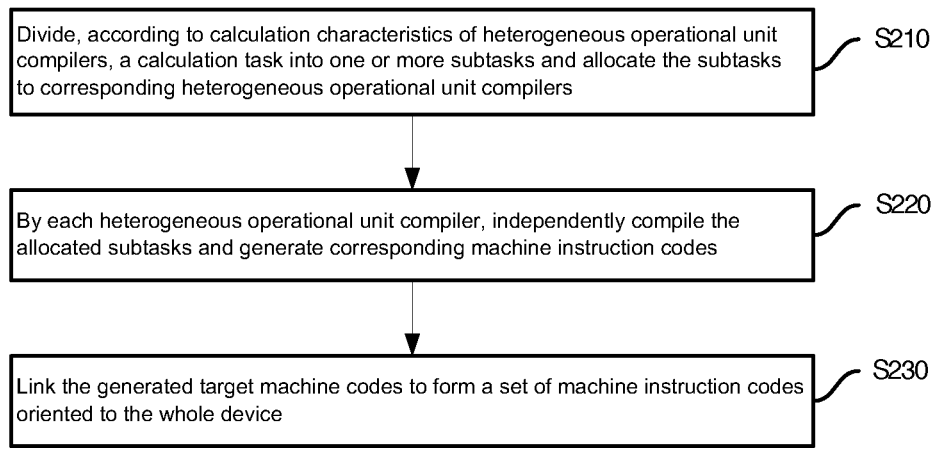
FIG. 2 shows a flowchart of a joint compilation method for a heterogeneous hardware architecture in combination with the system shown in FIG. 1.

Based on the system as shown in FIG. 1, the present invention provides a joint compilation method. In short, in this method, multiple types of heterogeneous operational unit compilers are automatically commanded to cooperate by the high-level compiler general control unit, so as to finally generate machine instruction codes oriented to the whole heterogeneous hardware architecture. Specifically, as shown in FIG. 2, the method includes the following steps.

Step 210: According to calculation characteristics of heterogeneous operational unit compilers, a calculation task is divided into one or more subtasks, and the subtasks are allocated to corresponding heterogeneous operational unit compilers.

The high-level compiler general control unit identifies compilers of all types of heterogeneous operational units, then divides the overall calculation task into one or more subtasks according to the calculation characteristics of the compilers, and allocates the subtasks to the corresponding types of heterogeneous operational unit compilers. The result of the subtask division needs to be correctly processed by the corresponding heterogeneous operational unit compilers.

In an embodiment, the subtask division is performed according to the following principle: for special heterogeneous operational units, since the special heterogeneous operational units can only process some limited specific calculation tasks but have high processing performance, the high-level compiler general control unit will preferentially allocate the specific calculation subtasks to the special heterogeneous operational units in a performance-oriented manner; and, for some relatively general heterogeneous operational units, since the heterogeneous operational units can process various calculation tasks in general but be disadvantageous in processing performance, the high-level compiler general control unit allocates some calculation tasks, which cannot be completed by the special heterogeneous operational units, to the general heterogeneous operational units according to functional requirements. In short, the high-level compiler general control unit can make different subtask division decisions according to the specific overall calculation task and the conditions of all types of heterogeneous operational units participating in the operation.

The interaction mode of allocating subtasks between the high-level compiler general control unit and various low-layer heterogeneous operational unit compilers can also adopt various means.

Figure 3:
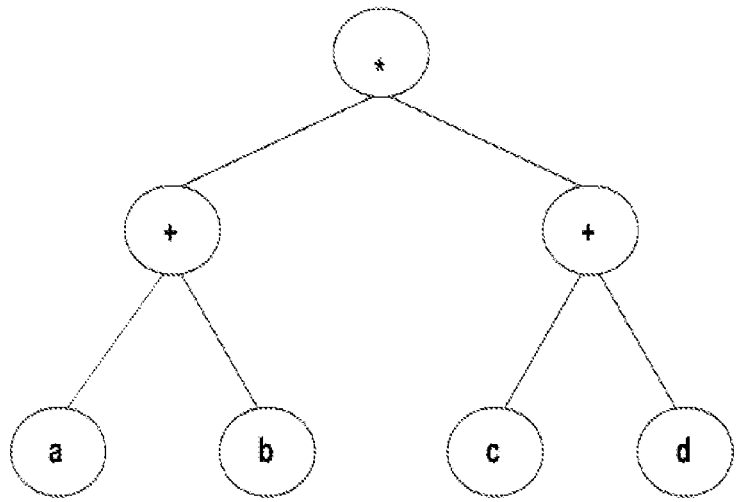
FIG. 3 shows a schematic diagram of a logical calculation task graph.

In an embodiment, the high-level compiler general control unit interacts with one of the heterogeneous operational unit compilers (e.g., the front end), and each heterogeneous operational unit compilers (the front end) interacts with at least one other heterogeneous operational unit (the front end). In this way, the high-level compiler can interact with one heterogeneous operational unit compiler, and the heterogeneous operational unit compilers interact with each other in turn. The specific process is as follows: the high-level compiler general control unit designs an overall calculation task graph that can be identified by all heterogeneous operational unit compilers and transmits the overall calculation task graph to a specific heterogeneous operational unit compiler (front end), for example, front end of the type-A heterogeneous operational unit compiler. The type-A heterogeneous operational unit compiler (front end) identifies task nodes that should not be processed by it, and merely processes task nodes that should be processed by it. After the type-A heterogeneous operational unit compiler (front end) completes processing, the calculation task graph is input to a subsequent heterogeneous operational unit compiler (front end) of a different type, for example, the front end of a type-B heterogeneous operational unit compiler, by that analogy, until all types of heterogeneous operational unit compilers (front ends) complete processing. In this way, after a particular heterogeneous operational unit compiler of each type identifies task nodes that should be processed by this heterogeneous operational unit compiler, these nodes can be arbitrarily replaced in the overall calculation task graph, without influencing other task nodes that should not be processed. Therefore, the overall calculation task graph output after being subjected to the processing and conversion of each particular heterogeneous operational unit compiler (front end) can be directly input to a next particular heterogeneous operational unit compiler for processing. For clarity, FIG. 3 briefly shows an example of a logical calculation task graph. In this example, the overall logical calculation task to be completed is (a+b)*(c+d), and the divided subtasks may include a part for addition operation and a part for multiplication operation. The high-level compiler general control unit may transmit the overall calculation task graph to a particular operational unit compiler, in which subtask nodes to be processed by different compilers will be identified.

In another embodiment, the high-level compiler general control unit interacts with various types of heterogeneous operational unit compilers, respectively, to realize the allocation of subtasks. In this way, the high-level compiler general control unit interacts with all various types of heterogeneous operational unit compilers. Specifically, the high-level compiler general control unit divides the overall calculation task graph in advance, constructs N calculation subtask graphs only for the current heterogeneous operational unit compliers, and inputs the calculation subtask graphs to particular heterogeneous operational unit compilers (e.g., front ends), respectively. A particular heterogeneous operational unit compiler (front end) only reads its own calculation subtask graph, and all subtask nodes contained in this calculation subtask graph will be processed by this particular heterogeneous operational unit compiler. Each particular heterogeneous operational unit compiler may arbitrarily convert the allocated calculation subtask graph.

It should be understood that those skilled in the art can also adopt other interactive ways of allocating subtasks, for example, a combination of the two ways described above. In addition, the module that receives and identifies the subtasks allocated by the high-level compiler general control unit is not necessarily implemented by the front end of the compiler. For example, the module may be a module independent of the front end, for example, a so-called subtask identification module, as long as the functions of the present invention can be realized.

Step S220: Each heterogeneous operational unit compiler independently compiles the allocated subtasks and generates corresponding machine instruction codes.

Each type of heterogeneous operational unit compiler independently compiles the calculation subtasks allocated thereto by the high-level compiler general control unit. From the perspective of the compilation of divided calculation subtasks alone, the compilers of each type of heterogeneous operational unit can be regarded as having a complete compilation process in the conventional meaning.

Through the interaction process of subtask allocation of the high-level compiler general control unit and various heterogeneous operational unit compilers and the compilation process of various heterogeneous operational unit compilers, an overall logical calculation task is eventually converted into a graph of physical calculation steps using various heterogeneous operational units. These physical calculation steps are compiled by various types of heterogeneous compilers, respectively. (Each compiler receives logical subtasks which are converted to generate appropriate physical calculation steps).

In the step S220, after each heterogeneous operational unit compiler completes compilation, corresponding target machine instruction codes are generated, for example, type-A heterogeneous operational unit machine instruction codes and type-B heterogeneous operational unit machine instruction codes.

In step S230: The generated target machine codes are linked to form a set of machine instruction codes oriented to the whole device.

After the high-level compiler general control unit drives all heterogeneous operational unit compilers to complete their respective compilations, in this step, the target machine instruction codes generated by all the heterogeneous operational unit compilers are combined and linked to form an overall set of machine instruction codes oriented to the whole device. This process is similar to the conventional linker, except that the linked target machine instruction codes are different from each other and need to be put into an aggregation of a particular format according to different levels and a particular reference relationship.

In the embodiment, the strategy for subtask division by the high-level compiler general control unit is determined at one time. However, in some embodiments, the subtask division can also be determined by multiple times of screening. For example, multiple different division strategies are tested or some identical subtask divisions are transmitted to compilers of multiple types of heterogeneous operational units, and global planning is performed according to the feedback result to finally determine an optimized subtask division strategy. In this way, each heterogeneous operational unit compiler also needs to return, to the high-level compiler general control unit, the compilation performance result data that can be obtained at its level, and the high-level compiler general control unit determines a preferred subtask division strategy according to the performance feedback. The performance data of each heterogeneous operational unit is provided by the corresponding compiler. The performance data includes, but not limited to: an execution time, bandwidth performance of various storage accesses, a duty or idle ratio, power consumption and the like. The performance data may be obtained by an estimation algorithm in the compiler, or simulated by the compiler using some software/hardware simulators, or actually measured on a real hardware system. In a case where the performance data is not estimated clearly, some particular subtask division schemes may be simultaneously transmitted to different heterogeneous operational unit compilers, so that various different performance results are specifically compared, and an optimal subtask division strategy is determined according to the overall calculation requirement context.

Specifically, in an embodiment, the optimized subtask division strategy is determined by the following process.

Step S310: A subtask division strategy is preliminarily determined according to the overall logical calculation task graph.

The step S310 includes the following sub-steps.

Step S3101: The overall logical calculation task graph is scanned, and directly allocated to a certain heterogeneous operational unit according to data features of logical operational task nodes in the overall logical calculation task graph.

For example, if it is known that some special heterogeneous operational units have relatively higher performance for some particular calculation subtask (combinations), once these logical operational task nodes (combinations) are found, the logical operational task nodes (combinations) will be allocated to these special heterogeneous operational units. Herein, this way is called a performance-oriented subtask division way.

S3102: After the determination of the performance-oriented division, an attempt will be made to allocate operational task nodes that have not been allocated in the overall logical calculation task graph to relatively general heterogeneous operational units for processing.

S3103: For an operational task node with some particular data features, if there is no absolute transcendental division strategy, a plurality of division sub-schemes may be established to simultaneously transmit the operational task node to different heterogeneous operational unit compilers for compilation, and a choice can be made according to the fed-back performance result.

Step S320: An optimized subtask division strategy is selected based on the compilation performance of the preliminarily determined subtask division strategy.

In this step, the subtask division strategy is optimized according to the compilation result, and multiple selections can be made until a compilation performance index is satisfied.

For example, in a case where a suitable subtask division strategy cannot be determined according to some local performance results (for example, compared with the subtask division strategy B, the subtask division strategy A can reduce the utilization of calculation resources of class X but will increase the utilization of memory access bandwidth of class Y at the same time. In some global situations, the calculation resources of class X are a unique performance bottleneck, so the subtask division strategy A is better; however in other global situations, the memory access bandwidth of class Y is a performance bottleneck, so the subtask division strategy B is better), each heterogeneous operational unit compiler may try various performance-oriented subtask division strategies and then select an optimal strategy according to the overall compilation estimation result. For example, the optimal strategy is determined based on the shortest total execution time or the lowest energy consumption ratio.

Figure 4:
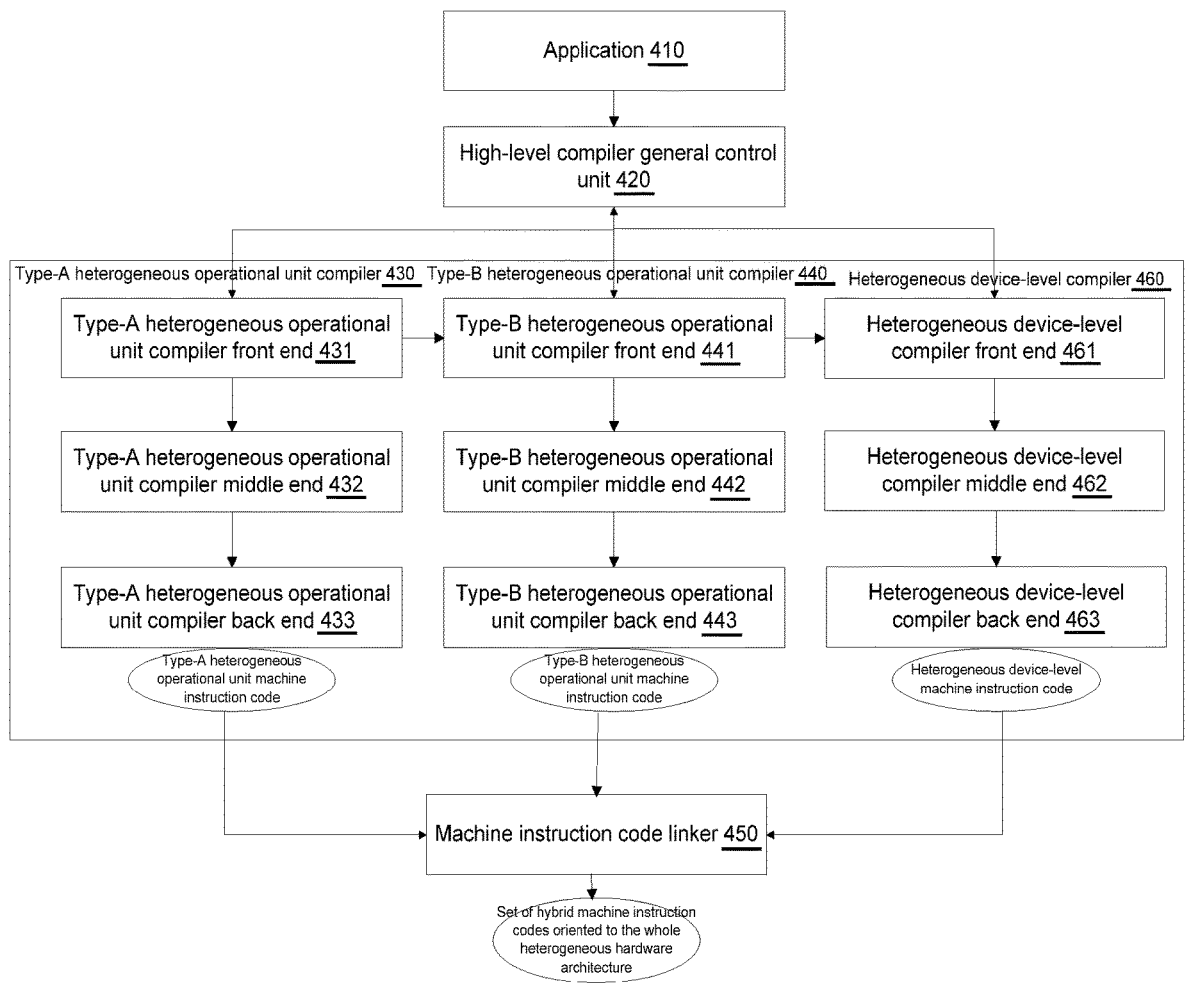
FIG. 4 shows a schematic diagram of a joint compilation system for a heterogeneous hardware architecture according to another embodiment of the present invention

FIG. 4 shows a joint compilation system for a heterogeneous hardware compiler according to another embodiment of the present invention. The system includes an application 410, a high-level compiler general control unit 420, a type-A heterogeneous unit compiler 430 (which is composed of a type-A heterogeneous operational unit compiler front end 431, a type-A heterogeneous operational unit compiler middle end 432 and a type-A heterogeneous operational unit compiler back end 433), a type-B heterogeneous operational unit compiler 440 (which is composed of a type-B heterogeneous operational unit compiler front end 441, a type-B heterogeneous operational unit compiler middle end 442 and a type-B heterogeneous operational unit compiler back end 443), a machine instruction code linker 450, and a device-level operational unit compiler 460 (which is composed of a heterogeneous device-level compiler front end 461, a heterogeneous device-level compiler middle end 462 and a heterogeneous device-level compiler back end 463). Unlike the system shown in FIG. 1, the system in this embodiment further includes a heterogeneous device-level compiler 460 which is in communication connection with the high-level compiler general control unit 420 and/or the type-B heterogeneous operational unit compiler 440. Herein, the device level refers to, for example, a CPU, a GPU, a DSP, an FPGA, or a hybrid calculation acceleration device combined by more than two calculation capabilities in the aforementioned calculation devices, for example, a GPU-ASIC hybrid calculation accelerator, a CPU+GPU+ASIC hybrid calculation accelerator or the like. The heterogeneous operational units refer to finer-grained calculation units contained in the device.

The heterogeneous device-level compiler 460 is configured to receive subtasks allocated to it and compile the subtasks to generate device-level target instruction codes. Therefore, the system in FIG. 4 can provide the joint compilation of heterogeneous units at different granularities or different levels inside devices (heterogeneous operational unit level) and outside devices (device level).

For the system in FIG. 4, the high-level compiler general control unit 420 can be used to realize the joint compilation of heterogeneous units (including device-level units and in-device units) at different levels in the heterogeneous hardware architecture. The joint compilation method is basically similar to the compilation method based on the system of FIG. 1, with the differences including but not limited to:

1) the overall calculation task graph that is subjected to the processing and conversion of all heterogeneous operational unit compilers can be directly output to the heterogeneous device-level compiler 460;

2) for the heterogeneous device-level compiler 460, it may also map each logical calculation subtask back to a new calculation result graph according to the result of the physical calculation step obtained by compiling this logical calculation subtask (the new calculation result graph is also a special intermediate representation, and each node in this graph corresponds to a compiled physical calculation step of a particular heterogeneous operational unit);

3) the heterogeneous device-level compiler 460 may generate a heterogeneous device-level machine instruction code after compilation; and 4) when it is necessary to test a plurality of different subtask division strategies, the heterogeneous device-level compiler 460 may also return, to the high-level compiler general control unit, compilation performance result data that can be acquired at its level, helping in making an overall decision.

In conclusion, for novel heterogeneous hardware architectures and their compilation requirements, the present invention provides a joint compilation method that integrates and uses heterogeneous hardware compilers at multiple levels. A user only needs to activate one compilation process for each overall calculation task, and an executable program body that can run on the heterogeneous hardware architecture and be mixed with hardware machine instruction codes of various heterogeneous units at different levels can be automatically generated, so that the whole heterogeneous hardware architecture can effectively run the whole application. By the joint compilation method, compilers of various types of heterogeneous operational units can be driven to participate in the finer-grained calculation task division, and the compilers of the heterogeneous operational units are automatically coordinated to realize various fine-grained interactions, so as to complete one overall compilation task. Moreover, the user only needs to provide a logical overall calculation task without considering that each part of calculation tasks is finally completed by which heterogeneous execution unit.

In the joint compilation method that integrates and uses various heterogeneous hardware compilers in the present invention, various heterogeneous hardware compilers are jointly used according to the characteristics of the calculation task and various heterogeneous operational units, and the automatic coordination, interaction, calculation subtasks division, and the final integration of respective compilation results are performed between the heterogeneous hardware compilers, so that an overall compilation process is completed jointly. With the introduction and development of multi-level and low-granularity heterogeneous calculation hardware architectures, there are more and more application scenarios to which the joint compilation method and system of the present invention can be applied.

The joint compilation system of the present invention may be a calculation system, for example, a desktop computer, a portable computer, a tablet computer, a smart phone or any other calculation devices, or may also be a system on chip (SOC). The system of the present invention is applicable to various fields such as word processing, voice recognition and processing, multi-language translation, image recognition, biometric feature recognition and intelligent control, and may be used as an intelligent calculation processing device, a robot, a mobile device or the like.

It is to be noted that, although the steps are described above in a specific order, it does not mean that the steps must be executed in the specific order. In fact, some of the steps can be executed concurrently or even in a changed order as long as the required functions can be realized.

In several embodiments provided in the present application, it should be understood that the disclosed system and method can also be implemented in other ways. The embodiments of the system described above are merely illustrative. For example, the flowcharts and block diagrams in the accompanying drawings show the architectures, functions and operations that are possibly realized by the device, method and computer program product according to various embodiments of the present invention. Each block in the flowcharts or block diagrams may represent a part of one module, program segment or code, and this part of the module, program segment or code contains one or more executable instructions used for implementing specified logical functions. It is also to be noted that, in some alternative implementations, the functions noted in the blocks can also occur in an order different from the order noted in the drawings. For example, two successive blocks may actually be executed substantially in parallel, or may sometimes be executed in a reverse order, depending on the functions involved. It is also to be noted that each block in the block diagrams and/or flowcharts and a combination of blocks in the block diagrams and/or flowcharts may be implemented by a special hardware-based system that executes specified functions or acts, or may be implemented by a combination of special hardware and computer instructions. In addition, the functional modules in various embodiments of the present invention can be integrated to form an independent part; or each module may exist independently; or two or more modules are integrated to form an independent part.

The present invention may be a system, a method and/or a computer program product. The computer program product may include a computer-readable storage medium loaded with computer-readable program instructions used for causing a processor to implement various aspects of the present invention.

The computer-readable storage medium may be a tangible device that holds and stores instructions used by an instruction execution device. For example, the computer-readable storage medium may include, but not limited to, an electrical storage device, a magnetic storage device, an optical storage device, an electromagnetic storage device, a semiconductor storage device or any suitable combination thereof. More specific examples (a non-exhaustive list) of the computer-readable storage medium include: a portable computer disk, a hard disk, a Random Access Memory (RAM), an Only-Read Memory (ROM), an Erasable Programmable Read-Only Memory (EPROM or flash memory), a Static Random Access Memory (SRAM), a portable Compact Disk Read-Only Memory (CD-ROM), a Digital Versatile Disk (DVD), a memory stick, a floppy disk, a mechanical encoding device, a punch card or in-groove bump structure on which instructions are stored for example, and any suitable combination thereof.

The embodiments of the present invention have been described above. The foregoing description is exemplary but not exhaustive, and is not limited to the disclosed embodiments. Many modifications and variations are apparent to a person of ordinary skill in the art without departing from the scope and spirit of the illustrated embodiments. The selection of the terms used herein is intended to best explain the principles of various embodiments, practical applications or technical improvements in the market or to enable a person of ordinary skilled in the art to understand various embodiments disclosed herein.

The invention claimed is:

1. A joint compilation method for a heterogeneous hardware architecture, comprising:
   determining, according to calculation characteristics of heterogeneous units in the hardware architecture, a strategy for dividing an overall calculation task graph into a plurality of subtasks, and allocating each of the plurality of divided subtasks to a corresponding heterogeneous unit compiler for compilation to generate corresponding target machine instruction codes; and
   linking the generated target machine instruction codes to form a set of machine instruction codes oriented to the heterogeneous hardware architecture, wherein the strategy for dividing the overall calculation task graph into a plurality of subtasks is determined by:
      marking out, from the overall calculation task graph, subtasks to be processed by a special heterogeneous unit compiler according to its specific calculation characteristics; and
      allocating unallocated subtasks in the overall calculation task graph to a general heterogeneous unit compiler for processing, and
   wherein each of the plurality of divided subtasks are allocated to a corresponding heterogeneous unit compiler by:
      dividing the overall calculation task graph into a plurality of subtask graphs in advance, wherein one subtask graph corresponds to one heterogeneous unit compiler and contains all subtask nodes to be processed by this heterogeneous unit compiler; and
      allocating each of the plurality of subtask graphs to a corresponding heterogeneous unit compiler, respectively.

2. The method according to claim 1, further comprising: dynamically optimizing, based on a compilation performance result fed back by the heterogeneous unit compilers, the strategy for dividing the overall calculation task graph into a plurality of subtasks.

3. The method according to claim 2, wherein the compilation performance result comprises at least one of an execution time of a heterogeneous unit, a bandwidth required for storage access, or a duty or idle ratio.

4. The method according to claim 1, wherein the heterogeneous unit compilers comprise one of a heterogeneous device-level compiler for a device, a heterogeneous operational-unit-level compiler for an operational unit in the device, or a combination of the heterogeneous device-level compiler and the heterogeneous operational-unit-level compiler.

5. A computer-readable storage medium having computer programs stored thereon, wherein the computer programs, when executed by a processor, implement the steps in the method according to claim 1.

6. A computer device comprising a memory and a processor, wherein computer programs that can run on the processor are stored on the memory, and wherein the processor implements the steps in the method according to claim 1 when executing the programs.

7. A joint compilation system for a heterogeneous hardware architecture, the system comprising: a memory and a processor implementing a plurality of heterogeneous unit compilers and a machine instruction code linker, wherein the processor is to:
   determine, according to calculation characteristics of heterogeneous units in the hardware architecture, a strategy for dividing an overall calculation task graph into a plurality of subtasks and allocate the plurality of divided subtasks to the plurality of corresponding heterogeneous unit compilers;
   compile the allocated subtasks to generate corresponding target machine instruction codes; and
   link the target machine instruction codes to form a set of machine instruction codes oriented to the heterogeneous hardware architecture, wherein to determine the strategy for dividing the overall calculation task graph into a plurality of subtasks, the processor is to:
      mark out, from the overall calculation task graph, subtasks to be processed by a special heterogeneous unit compiler according to its specific calculation characteristics; and
      allocate unallocated subtasks in the overall calculation task graph to a general heterogeneous unit compiler for processing, and
   wherein to allocate each of the plurality of divided subtasks to a corresponding heterogeneous unit compiler, the processor is to:
      divide the overall calculation task graph into a plurality of subtask graphs in advance, wherein one subtask graph corresponds to one heterogeneous unit compiler and contains all subtask nodes to be processed by this heterogeneous unit compiler; and
      allocate each of the plurality of subtask graphs to a corresponding heterogeneous unit compiler, respectively.

8. The system according to claim 7, wherein the high-level compiler general control unit is in communication connection with one of the plurality of heterogeneous unit compilers, and the processor is to transmit the overall calculation task graph to said one of the plurality of heterogeneous unit compilers for compilation, wherein the overall calculation task graph contains subtask nodes to be compiled by the plurality of heterogeneous unit compilers; and
   said one of the plurality of heterogeneous unit compilers is in communication connection with another heterogeneous unit compiler, and the processor is to identify its own subtask node from the overall calculation task graph, then compile the subtask node and transmit the overall task graph to said another heterogeneous unit compiler.

9. The system according to claim 7, wherein the plurality of heterogeneous unit compilers comprise one of a heterogeneous device-level compiler for a device, a heterogeneous operational-unit-level compiler for an operational unit in the device, or a combination of the heterogeneous device-level compiler and the heterogeneous operational-unit-level compiler.

10. The system according to claim 9, wherein the device is at least one of CPU, GPU, DSP, FPGA and ASIC or a device combined by at least two of them.

* * * * *